United States Patent [19]

Behr et al.

[11] Patent Number: 5,085,464
[45] Date of Patent: Feb. 4, 1992

[54] AIR BAG FIRING CIRCUIT

[75] Inventors: Leonard W. Behr, Pontiac; Craig W. White, Grosse Pointe, both of Mich.

[73] Assignee: Automotive Systems Laboratory, Inc., Farmington Hills, Mich.

[21] Appl. No.: 612,783

[22] Filed: Nov. 14, 1990

[51] Int. Cl.$^5$ .............................................. B60R 21/32
[52] U.S. Cl. ................................. 280/735; 180/282; 307/10.1; 340/436
[58] Field of Search .................. 280/734, 735, 741; 180/282; 340/436; 307/10.1

[56] References Cited

U.S. PATENT DOCUMENTS

| 3,889,232 | 6/1975 | Bell | 280/735 |
|---|---|---|---|
| 4,166,641 | 9/1979 | Okada et al. | 280/735 |
| 4,695,075 | 9/1987 | Kamiji et al. | 280/735 |
| 4,827,091 | 5/1989 | Behr | 200/61.45 M |
| 4,851,705 | 7/1989 | Musser et al. | 180/282 |
| 4,958,851 | 9/1990 | Behr et al. | 180/282 |

Primary Examiner—Kenneth R. Rice
Attorney, Agent, or Firm—Lyon & Delevie

[57] ABSTRACT

An air bag firing circuit comprises a firing path which includes redundant acceleration sensors, i.e., two sensors of like threshold connected in parallel. Each sensor comprises normally-open switch means operated by an inertial mass and shunted by a resistor. A battery maintains a known voltage across the firing path while a microprocessor checks the integrity of the firing path by periodically reading and comparing the voltages achieved at various points thereabout. The microprocessor further tests each sensor individually by electromagnetically biasing the sensor's inertial mass in a manner so as to close the switch means thereof while determining the effect of such testing on the voltages achieved about the firing path. Upon the detection of a sensor failure, the microprocessor electromagnetically biases the sensor's inertial mass in a manner so as to maintain the switch means thereof in its open position, whereby the malfunctioning sensor is functionally removed from the firing path without impairing the function of the other sensor connected in parallel therewith.

3 Claims, 2 Drawing Sheets

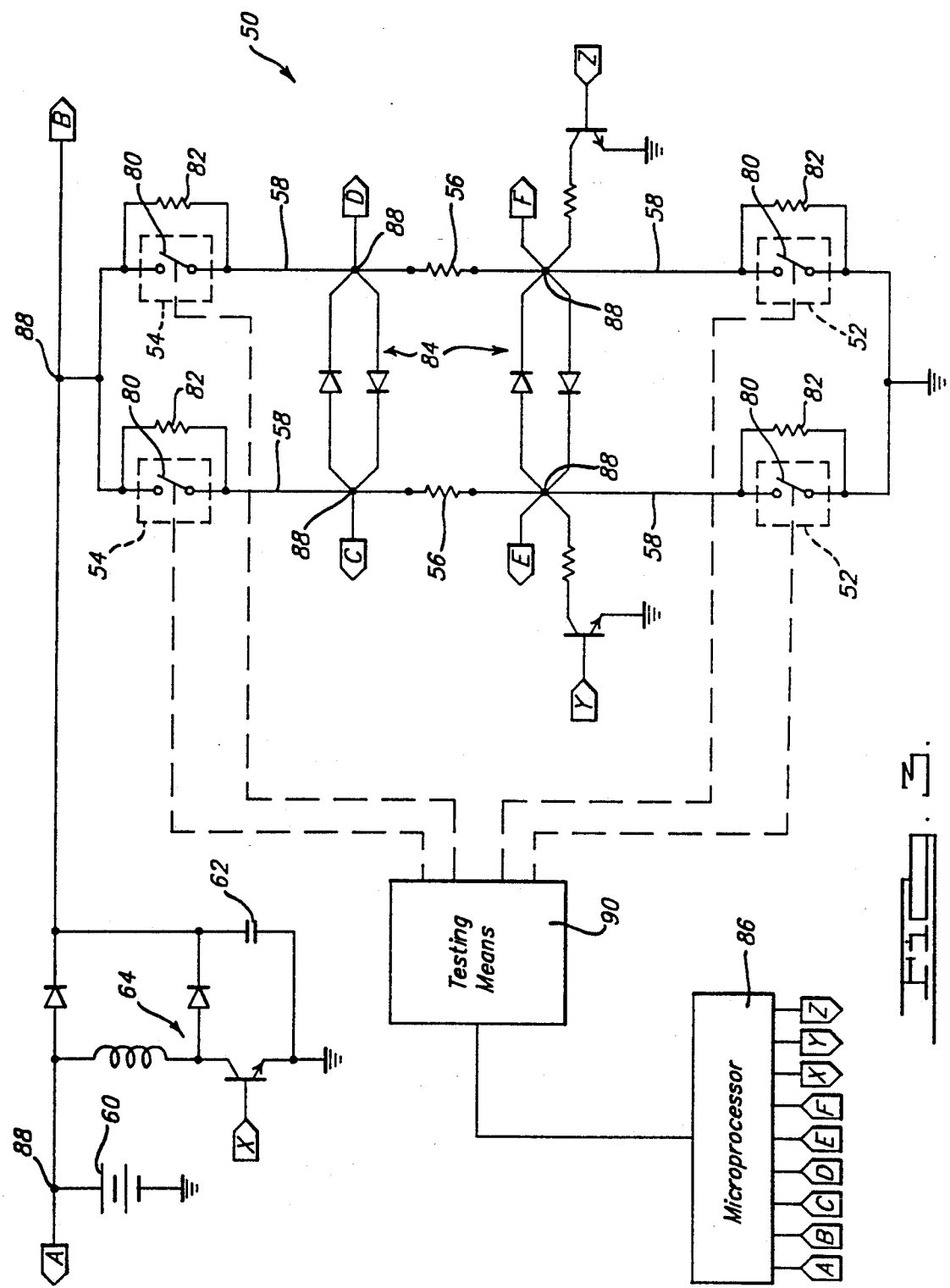

AIR BAG FIRING CIRCUIT

BACKGROUND OF THE INVENTION

The instant invention relates to control circuits for vehicle passenger safety restraint systems, such as air bags, comprising a firing path which includes at least two acceleration sensors whose acceleration-responsive switches are connected in parallel with one another for purposes of redundancy.

Known air bag passenger restraint systems employ a control circuit wherein a power supply applies a voltage across a firing path which includes in series an explosive squib and at least two acceleration sensors having normallyopen acceleration-responsive switches therein. The switch of each sensor is shunted by a resistor having a nominal resistance substantially greater than the internal resistance of the squib. Thus, a small current nominally flows through the firing path while the switches of the sensors remain in their normally-open positions. The closure of the sensors's switches in response to a collision or marked vehicle deceleration causes a significant rise in the current flowing through the squib, thereby "firing" the squib and triggering deployment of the air bag. See, e.g., U.S. Pat. No. 4,695,075, issued Sept. 22, 1987 to Kamiji et al.

In U.S. Pat. No. 4,851,705 issued July 25, 1989, Musser et al. teach an air bag firing circuit comprising two parallel crash sensors and two parallel safing sensors connected to an explosive squib so as to trigger the deployment of an air bag upon the simultaneous closure of one or more crash sensors and one or more safing sensors. The firing circuit thus provides redundant firing paths to permit continued operation of the firing circuit notwithstanding the failure a crash sensor and-/or a safing sensor in its "open" position, or in the event that one such redundant sensor is disconnected from the circuit as a result of a crash condition. The use of such redundant crash and safing sensors further permits the positioning of such sensors in different locations about the vehicle to increase the variety of vehicle acceleration conditions sensed thereby, whereby the vehicle passengers are afforded still greater levels of protection. Musser et al. further teaches the use of a pair of diode bridges to obtain full firing circuit diagnosability, whereby the malfunction of any given circuit component, including the crash and safing sensors, is readily detected.

Unfortunately, upon the detection of a failure of a redundant sensor in the closed position, or with a "propensity to close", the viability of the firing circuit is severely impaired by the resulting short-circuiting of the stilloperable sensor located in parallel with the failing sensor.

Under the prior art, if the switch of either sensor fails in its closed position, or with a propensity to close, the prior art teaches the disabling of the entire control circuit to prevent the unintentional or premature triggering of the passenger restraint, once again placing the passengers at risk. See, e.g., U.S. Pat. No. 3,889,232, issued June 10, 1975 to Bell, wherein the control circuit shuts down when one sensor closes without the corresponding closing of the other sensor.

Alternatively, in our U.S. Pat. No. 4,958,851 issued Sept. 25, 1990, we teach an air bag firing circuit whose firing path comprises at least two acceleration sensors connected in series with an explosive squib. The firing circuit further includes means for functionally removing a malfunctioning sensor from the firing path by closing or shunting the malfunctioning sensor, thereby providing continued protection of the vehicle passengers under the control of the remaining, still-operable sensor(s). However, such closure or shunting of the failing sensor necessarily removes any operable, redundant sensor, i.e., one connected in parallel with the failing sensor, from the firing path, with an attendant reduction in the protection afforded vehicle passengers by the safety restraint.

SUMMARY OF THE INVENTION

It is an object of the instant invention to provide a control circuit for a vehicle passenger safety restraint which includes redundant acceleration sensors, i.e., at least two sensors whose acceleration-responsive switches are connected in parallel in the firing path thereof, and featuring continuing circuit viability notwithstanding the malfunction, or "failure", of one of the redundant sensors.

A further object of the instant invention is to provide a control circuit for a vehicle passenger safety restraint comprising redundant acceleration sensors which remains viable upon the malfunction of one of the redundant sensors irrespective of the failure mode thereof, i.e., whether the sensor fails permanently open, with a propensity to close, or permanently closed.

The instant control circuit for a vehicle passenger safety restraint comprises first means, such as a first acceleration sensor, for generating an output signal in response to an acceleration input exceeding a given threshold; second means, such as a second acceleration sensor, for generating substantially the same output signal in response to an acceleration input exceeding substantially the same threshold; and trigger means, in communication with the first and second sensors, for actuating the passenger restraint upon receipt of the output signal from either the first or the second sensor. The instant control circuit further comprises means for detecting a sensor malfunction, i.e., a failure of either sensor to properly respond to acceleration; and signalinhibiting means responsive to the failure detecting means for preventing the generation of the output signal by the failing sensor or otherwise preventing communication between the failing sensor and the trigger means, whereby operability of the control circuit and, hence, vehicle passenger protection are maintained notwithstanding such sensor failure.

In a preferred embodiment of the instant control circuit for deploying an air bag, the first and second signalgenerating means comprise a pair of acceleration sensors whose normally-open, acceleration-responsive switch means are connected in parallel between a power source, such as a battery, and the air bag trigger means, such as an explosive squib. The switch means of each sensor is also shunted by a resistor having a nominal resistance substantially greater than the nominal resistance of the squib, whereby a low current nominally flows through the firing path. Each sensor includes first means for nominally biasing its switch means to its open position. When either sensor experiences an acceleration input which exceeds the nominal bias on its switch means, the switch means closes to provide increased current flow through the squib, whereupon the squib explodes to trigger deployment of the air bag. Preferably, at least one low-threshold "safing" sensor forms a part of the return path from the squib to the battery to prevent premature or accidental triggering thereof.

The failure detecting means of the preferred embodiment comprises means for testing each sensor, such as means operative to close the switch means thereof without regard to acceleration; and means for detecting the change in the output of each sensor upon operating such sensor testing means. In the preferred embodiment, where each sensor comprises first biasing means for normally biasing the switch means thereof to its open position, the failure detecting means comprises second biasing means operable to bias the sensor's switch means to its closed position without regard to acceleration. Since the switch means of each sensor forms a portion of a firing path across which a known voltage is applied, the operability of each switch means is confirmed by detecting and comparing the voltage achieved at a point about the firing path before and during operation of such second switch biasing means. Alternatively, the instantaneous position of each sensor's switch means and, hence, information regarding sensor operability are ascertained by detecting and comparing the voltages achieved at various points about the firing path, as taught in U.S. Pat. No. 4,851,705 issued July 25, 1989, to Musser et al.

In the preferred embodiment, the signal-inhibiting means responsive to the failure detecting means comprises means for maintaining the switch of the malfunctioning sensor in its open position without regard to acceleration. In this regard, it is noted that the second biasing means used to test sensor function in the preferred embodiment most preferably operates electromagnetically and, hence, may also be used to bias the switch means of the malfunctioning sensor towards, and thereafter maintain the switch means in, its open position. The malfunctioning sensor is thus functionally removed from the firing path to ensure continuing circuit viability under the control of the remaining, still-operable sensor.

BRIEF DESCRIPTION OF THE DRAWINGS

FIG. 3 is a schematic circuit diagram of an air bag firing circuit constructed in accordance with the instant invention.

DETAILED DESCRIPTION OF THE PREFERRED EMBODIMENT OF THE INVENTION

Figure 1:
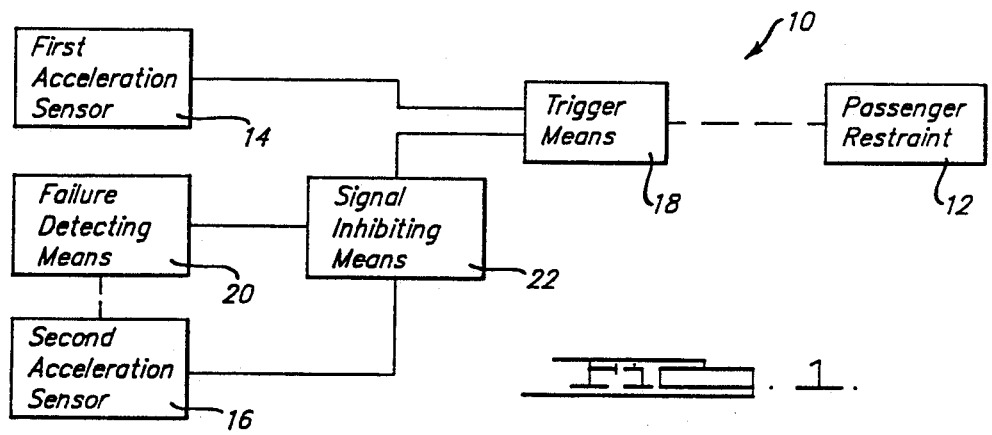
FIG. 1 is a block diagram of the passenger safety restraint control circuit of the instant invention whose firing path includes a pair of redundant accelerations sensors, i.e., each sensor being capable of generating the output signal for triggering deployment of the restraint; means for detecting a failure of the second sensor to properly respond to acceleration inputs thereto; and signal-inhibiting means for functionally removing the second acceleration sensor from the firing path upon detection of a failure thereof.

Referring to FIG. 1, a control circuit 10 for actuating a vehicle passenger safety restraint 12 includes a first and second acceleration sensors 14 and 16 for generating an output signal sufficient to activate a restraint trigger means 18 in communication therewith in response to acceleration inputs to the sensors 14 and 16 exceeding the acceleration thresholds thereof, respectively. The control circuit 10 further comprises means 20 for detecting a failure of the second sensor 16 to properly respond to acceleration; and means 22 responsive to the failure detecting means 20 for inhibiting the signal which might otherwise be generated by the second sensor 16 subsequent to detection of a failure thereof, whereby the malfunctioning second sensor 16 is functionally removed from the instant circuit 10.

It is noted that, for ease of illustration, FIG. 1 shows failure detecting means 20 and signal-inhibiting means 22 operable to test and subsequently functionally remove, respectively, only the second sensor 16 from the instant control circuit 10. It will be readily appreciated, however, that the first sensor 14 may also be provided with failure detecting and signal-inhibiting means therefor, as in the exemplary air bag firing circuit 50 shown in FIG. 3 and described hereinbelow.

Figure 2:
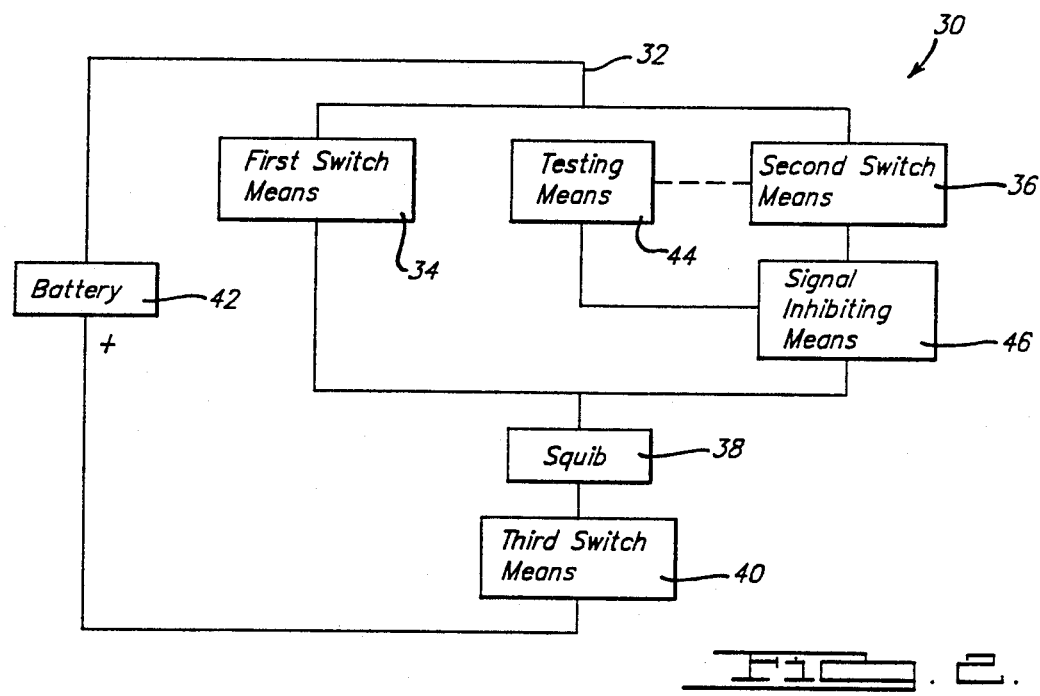
FIG. 2 is a schematic electrical block diagram of an air bag firing circuit whose firing path includes parallel, normally-open, acceleration-responsive switch means which close to fire an explosive squib when the acceleration input to either switch exceeds the nominal bias thereon, respectively; means for detecting a failure of the second switch means to properly respond to acceleration inputs thereto; and signal-inhibiting means responsive to switchtesting means for functionally removing the second switch means from the firing path upon detection of a failure thereof.

FIG. 2 is a schematic electrical block diagram of an air bag firing circuit 30 in accordance with the instant invention whose firing path 32 includes in series a first and second normally-open, high-threshold, acceleration-responsive switch means 34 and 36 connected in parallel; an explosive squib 38 for triggering deployment of the air bag (not shown); and a third normally-open, low-threshold, accelerationresponsive switch means 40. A battery 42, applies a voltage across the firing path 32, whereby a voltage "signal" is sent to the squib 38 upon the simultaneous closure of the third switch means 40 and either of the first or second switch means 34 and 36, whereupon the squib 38 explodes to trigger deployment of the air bag.

The firing circuit 30 of FIG. 2 further comprises testing means 44 for detecting a failure of the second switch means 36 to properly close in response to acceleration; and signal-inhibiting means 46 connected in series with the second switch means 36 to prevent a voltage "signal" thereafter generated by the failing second switch means 36 from reaching the squib 38. In this manner, the second switch means 36 is functionally removed from the firing path 32 of the firing circuit 30 upon the detection of a failure thereof.

As noted with respect to FIG. 1, the instant invention similarly contemplates the testing and subsequent isolation, where required, of the first switch means 34, in addition to the testing means 44 and signal-inhibiting means 46 illustrated in FIG. 2.

FIG. 3 shows an exemplary air bag firing circuit 50 comprising two crash sensors 52 and two safing sensors 54 connected to a pair of explosive squibs 56 so as to trigger the deployment of a pair of air bags (not shown) upon the simultaneous closure of one of the crash sensors 52 and one of the safing sensors 54. The firing circuit 50 thus provides redundant firing paths 58 to permit continued firing circuit viability notwithstanding the failure a single crash sensor 52 and/or a single safing sensor 54.

More specifically, a battery 60 applies a known voltage across the firing paths 58. The battery 60 is capable of supplying a current through the firing path 58 sufficient to explode both squibs 56 upon the simultaneous closure of at least one crash sensor 52 and at least one safing sensor 54. A reserve power supply including a capacitor 62 and charge pump 64 maintains the applied voltage in the event that the battery 60 malfunctions or is otherwise isolated from the firing circuit 50 during a vehicle collision.

Figure 4:
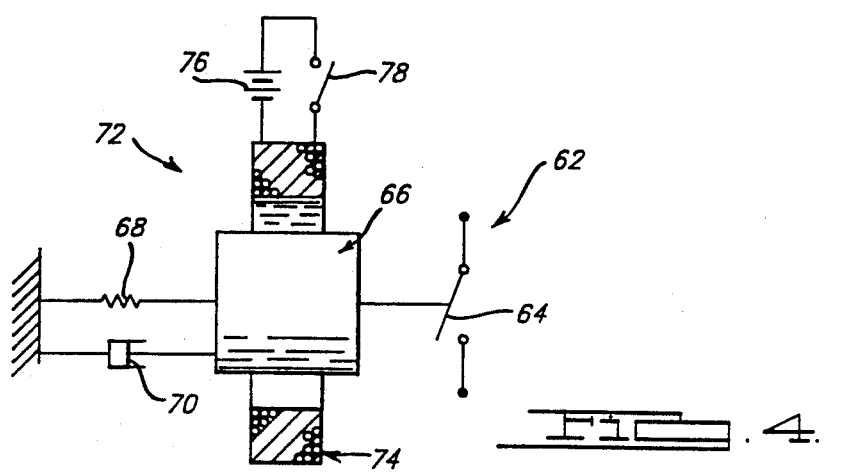
FIG. 4 is a schematic representation of an acceleration sensor preferably employed in the air bag firing circuit of FIG. 3.

A schematic representation of an exemplary sensor 62 is shown in FIG. 4, a constructed embodiment of which is taught in U.S. Pat. No. 4,827,091 issued May 2, 1989, to Behr. Each sensor 62 comprises a normally-open switch 64 which is operated by an acceleration-responsive inertial mass 66. The inertial mass 66 is nominally biased by a first biasing means, represented schematically by spring 68 in FIG. 4, so as to maintain the switch 64 in its normally-open position until the nominal bias is overcome by an acceleration input to the sensor 62, whereupon the inertial mass 66 moves to close the switch 64 thereof. Such movement of the inertial mass 66 is damped by suitable damping means therefor, represented schematically as a dashpot 70 in FIG. 4.

Each sensor 62 further comprises second biasing means 72 operative to bias the sensor's inertial mass 66 so as to close the switch 64 thereof without regard to acceleration. In the preferred embodiment, the inertial mass 66 is formed of a magnetic material, and the second biasing means comprises a coil 74 which generates an electromagnetic field for magnetically interacting with the inertial mass 66 upon the delivery of a direct current therethrough, as by connecting the coil 74 with battery 76 via a control switch 78. As such, the electromagnetic biasing means 72 of the preferred embodiment permits both the testing of the sensor 62 by closing the switch 64 thereof without regard to acceleration, as well as operating to maintaining the switch 64 of the sensor in its open position upon detecting a failure thereof, by directing a suitable current through the coil 74 thereof in the appropriate direction, as will be described more fully hereinbelow.

Returning to FIG. 3, the normally-open switch means 80 (hereinafter "switch 80") of each of the safing and crash sensors 52 and 54 is shunted by a resistor 82 of like nominal resistance. Preferably, the nominal resistance of the shunting resistors 82 is several orders of magnitude larger than the nominal internal resistance of the squib 56. In normal operation, the shunting resistors 82 maintain a relatively low current flow through the firing path 58 and, hence, through the squib 56 thereof. Upon the simultaneous closure of either of the crash sensors 52 and either of the safing sensors 54 due to an acceleration exceeding the respective thresholds thereof, the shunting resistors 82 are shorted, whereby the current flowing through each squib 56 is increased to a value above the firing threshold thereof to explode same and trigger deployment of each air bag.

A malfunction of any of the sensors 52 or 54 is detected with the aid of a pair of diode bridges 84 which bridge the firing paths 58 of the firing circuit 50. Specifically, a microprocessor 86 reads and compares the voltages achieved at a plurality of points 88 about the firing path 58 via suitable input ports "A" through "F" thereon, respectively, to determine if any of the components thereof has malfunctioned or "failed," e.g., whether the switch 80 of any of the sensors 52 or 54 is stuck in its closed position. Specifically, upon a failure of one or more of the sensors 52 and 54, the normal flow of current through the firing path 58 is disrupted, thereby altering the voltages at one or more points 88 thereabout. Since each malfunction affects the voltages achieved about the firing path in a different manner, the identity of the malfunctioning component is determined upon examination and comparison of such voltages.

In the event that the voltage readings from the points 88 about the firing circuit 50 are consistent with operable sensors, the microprocessor 86 further confirms the operability of each individual sensor 52 or 54 by sequentially operating sensor testing means 90 (as by energizing the coil 74 of the sensor 62 shown in FIG. 4) to close its switch 80 while monitoring the voltages achieved at various points 88 about the firing circuit 50.

The proper dynamic operation of each sensor 52 and 54, i.e., the proper functioning of both its first biasing means (spring 68 of the sensor 62 shown in FIG. 4) and its damping means (dashpot 70 of FIG. 4) is also confirmed by measuring the time interval required for the sensor's switch 80 to close subsequent to operation of the sensor testing means 90 (energizing the coil 74 of FIG. 4). The failure of the sensor's switch 80 to close, a sluggish switch closing, or a too-rapid closing of the sensor's switch 80 indicates a potentially critical sensor malfunction.

In accordance with the instant invention, upon the detection of a malfunction of one of the sensors 52 or 54, the switch 80 of the failing sensor 52 or 54 is opened and thereafter maintained in its open position by operation of its second biasing means (energizing its coil 74). The failing sensor 52 or 54 is thus functionally removed from the firing path 58. As noted hereinabove, the other sensor 52 or 54 connected in parallel with the failing sensor 52 or 54 continues to provide protection to vehicle passengers.

While the preferred embodiment of the invention has been disclosed, it should be appreciated that the invention is susceptible of modification without departing from the spirit of the invention or the scope of the subjoined claims.

We claim:

1. A control circuit for a vehicle passenger safety restraint comprising:
    first means operative to generate an output signal in response to an acceleration input exceeding a first threshold;
    second means operative to generate said output signal in response to an acceleration input exceeding a second threshold;
    trigger means, in communication with said first and second signal-generating means, for actuating said passenger restraint upon receipt of said output signal;
    failure-detecting means for detecting a malfunction of said second signal-generating means; and
    means responsive to said failure detecting means for inhibiting the communication of said output signal from said second signal-generating means to said trigger means.

2. The control circuit of claim 1 wherein:
    said second signal-generating means comprises switch means having an open position and a closed position, said output signal being generated when said switch means is in said closed position; and
    said signal-inhibiting means comprises means for biasing said switch means to said open position.

3. An air bag firing circuit comprising:

a firing path including, in series:
  a first normally-open switch means, said first switch means closing in response to an acceleration input exceeding a first threshold;
  a second normally-open switch means connected in parallel with said first switch means, said second switch means closing in response to an acceleration input exceeding a second threshold substantially similar to said first threshold; and
  a squib having a nominal electrical resistance;
means for applying a voltage across said firing path;
failure-detecting means for detecting a malfunction of said second switch means; and
means responsive to said failure-detecting means for maintaining said second switch means in its open position without regard to acceleration inputs thereto.

* * * * *